United States Patent
Sasaki

(10) Patent No.: US 12,488,426 B2
(45) Date of Patent: Dec. 2, 2025

(54) IMAGE PROCESSING DEVICE AND METHOD FOR IMAGE PROCESSING

(71) Applicant: CANON KABUSHIKI KAISHA, Tokyo (JP)

(72) Inventor: Yoshitaka Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 18/335,371

(22) Filed: Jun. 15, 2023

(65) Prior Publication Data

US 2024/0013361 A1    Jan. 11, 2024

(30) Foreign Application Priority Data

Jul. 6, 2022    (JP) .................. 2022-109291

(51) Int. Cl.
  *G06T 5/50* (2006.01)
  *G06T 5/70* (2024.01)
  (Continued)

(52) U.S. Cl.
  CPC .................. *G06T 5/50* (2013.01); *G06T 5/70* (2024.01); *G06T 7/13* (2017.01); *G06T 7/70* (2017.01);
  (Continued)

(58) Field of Classification Search
  CPC .... G06T 5/50; G06T 5/70; G06T 7/13; G06T 7/70; G06T 2207/20221; G06V 10/25; G06V 40/28; G06V 20/20
  See application file for complete search history.

(56) References Cited

U.S. PATENT DOCUMENTS

| 10,229,313 B1* | 3/2019 | Gribetz | G06F 3/011 |
| 2007/0211154 A1* | 9/2007 | Mahmoud | H04N 25/61 |
| | | | 348/E5.079 |

(Continued)

FOREIGN PATENT DOCUMENTS

| JP | 2010177882 A | * | 8/2010 |
| JP | 2011-166535 A | | 8/2011 |

OTHER PUBLICATIONS

Schroder, Matthias, and Helge Ritter. "Hand-Object Interaction Detection with Fully Convolutional Networks." 2017 IEEE Conference on Computer Vision and Pattern Recognition Workshops (CVPRW), IEEE, 2017, pp. 1236-1243, https://doi.org/10.1109/CVPRW.2017.163. (Year: 2017).*

*Primary Examiner* — King Y Poon
*Assistant Examiner* — Patrick P Galera
(74) *Attorney, Agent, or Firm* — Venable LLP

(57) ABSTRACT

An image processing device acquires a second image, obtained by subjecting a pixel of a first image, in which a hand is captured, to correction processing with a correction amount in accordance with a position of the pixel in the first image. The image processing device sets a reduction intensity of noise of the second image, on the basis of the correction amount of the correction processing to a position of the hand. The image processing device generates a third image in which the noise of the second image is reduced by the reduction intensity. The image processing device detects a region of the hand from the third image, and generates a composited image by compositing a CG image and an image of the region of the hand with the third image, with reference to information of the region of the hand.

14 Claims, 12 Drawing Sheets

(51) Int. Cl.
*G06T 7/13* (2017.01)
*G06T 7/70* (2017.01)
*G06V 10/25* (2022.01)
*G06V 40/20* (2022.01)

(52) U.S. Cl.
CPC .............. *G06V 10/25* (2022.01); *G06V 40/28* (2022.01); *G06T 2207/20221* (2013.01)

(56) References Cited

U.S. PATENT DOCUMENTS

| | | | |
|---|---|---|---|
| 2015/0269406 A1* | 9/2015 | Hama | G06V 40/12 |
| | | | 382/124 |
| 2016/0259608 A1* | 9/2016 | Bean | G06F 3/14 |
| 2020/0118341 A1* | 4/2020 | Ohashi | H04N 9/75 |
| 2023/0418390 A1* | 12/2023 | Schwarz | G06F 3/011 |

\* cited by examiner

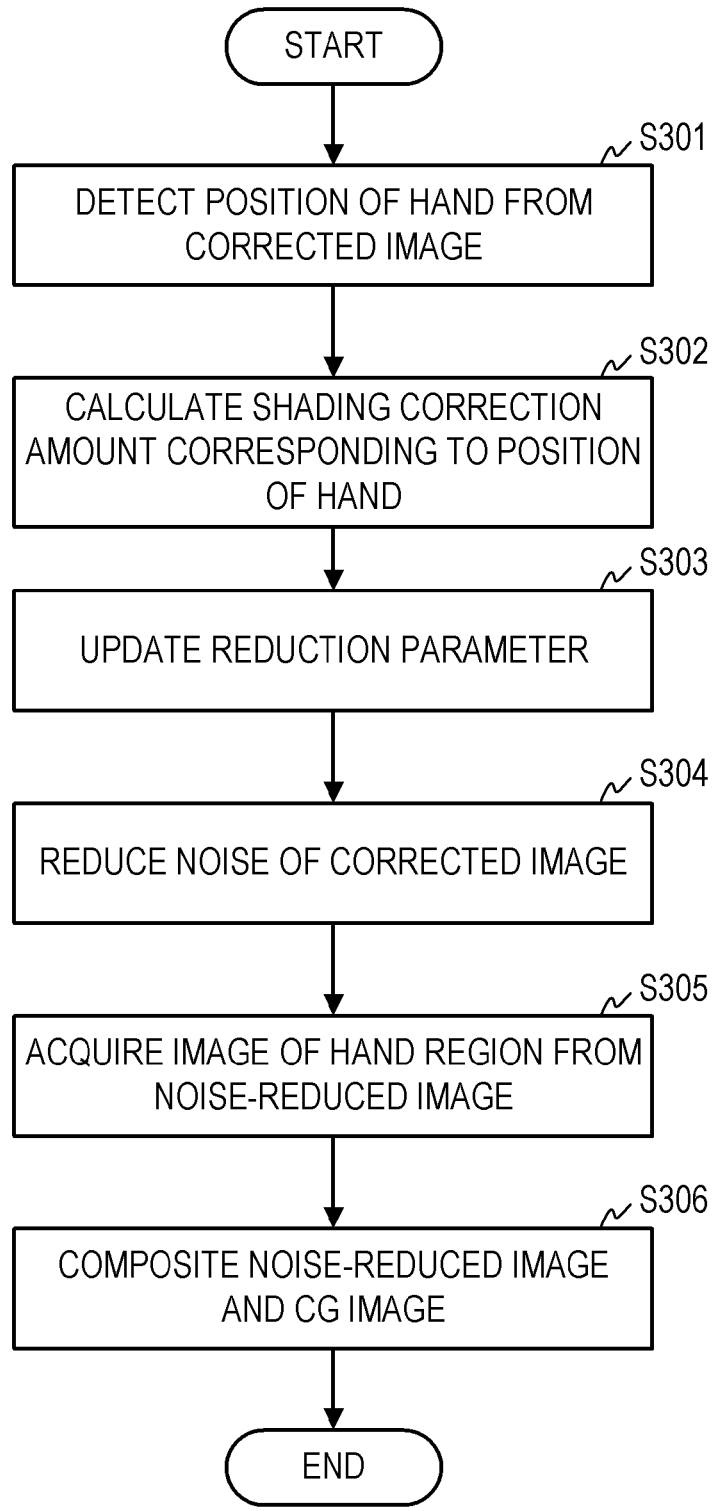

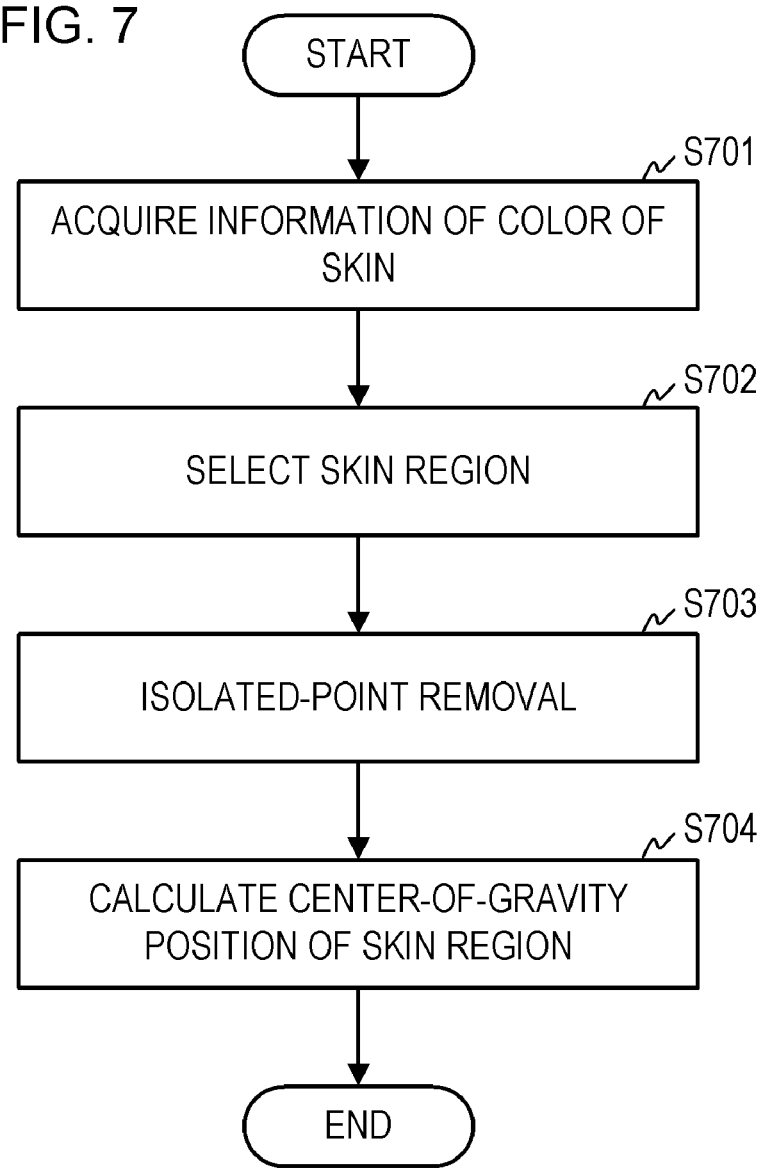

IMAGE PROCESSING DEVICE AND METHOD FOR IMAGE PROCESSING

BACKGROUND OF THE INVENTION

Field of the Invention

The present invention relates to an image processing device and a method for image processing.

Description of the Related Art

There is known, as a technology relating to mixed reality (MR) in which seamless fusion of real space and virtual space is realized, an MR system using a video see-through head-mounted display (HMD). In MR systems, composited images, in which images of real space that are image-captured (captured images) by an image-capturing device (video camera or the like) are composited with computer graphics (CG) images in accordance with the position and attitude of the image-capturing device, are generated. The user then observes the composited image by the composited image being displayed on a display device (a display of the HMD or the like).

MR systems have, for example, hand tracking functions (functions of detecting a hand in a captured image and tracking motions thereof) and hand gesture functions (functions of recognizing the form of the hand in the captured image).

Also, MR systems have, for example, hand-masking functions (functions of extracting a hand from a captured image and compositing the hand on a CG image so that the hand is not hidden behind the CG image). There are cases in which performance of these functions deteriorates under effects of amplified noise due to image processing (processing for reducing variance in lightness of captured images caused by a lens of the image-capturing device).

Accordingly, Japanese Patent Application Publication No. 2011-166535 discloses technology for suppressing the effects of noise by detecting a position of a hand in a captured image before noise is amplified.

SUMMARY OF THE INVENTION

However, in hand-masking functions, the region of the hand needs to be detected, not just a position of one point of the hand. Accordingly, even in a case of detecting the region of the hand in captured images before noise is amplified, there are cases in which the region of the hand cannot be appropriately detected, due to variance in lightness among positions, caused by the lens. That is to say, an appropriate region of the hand cannot be composited with the CG image in the hand-masking functions.

Accordingly, an object of the present invention is to provide technology that, in a case of compositing an image of a region of a hand overlaid upon a CG image, enables a more appropriate image of the region of the hand to be composited.

An aspect of the present invention is a an image processing device including at least one memory and at least one processor which function as an acquisition unit configured to acquire a second image, obtained by subjecting a pixel of a first image, in which a hand of a user is captured, to correction processing with a correction amount in accordance with a position of the pixel in the first image; a setting unit configured to set a reduction intensity of noise of the second image, on a basis of the correction amount of the correction processing to a position of the hand in the first image; a processing unit configured to generate a third image in which the noise of the second image is reduced by the reduction intensity set by the setting unit; a detection unit configured to detect a region of the hand from the third image; and a compositing unit configured to generate a composited image by compositing a computer graphics (CG) image and an image of the region of the hand with the third image, with reference to information of the region of the hand detected by the detecting unit.

An aspect of the present invention is a method for image processing, comprising: acquiring a second image, obtained by subjecting a pixel of a first image, in which a hand of a user is captured, to correction processing with a correction amount in accordance with a position of the pixel in the first image; setting a reduction intensity of noise of the second image, on a basis of the correction amount of the correction processing to a position of the hand in the first image; generating a third image in which the noise of the second image is reduced by the reduction intensity set in the setting; detecting a region of the hand from the third image; and generating a composited image by compositing a computer graphics (CG) image and an image of the region of the hand with the third image, with reference to information of the region of the hand detected in the detecting.

Further features of the present invention will become apparent from the following description of exemplary embodiments with reference to the attached drawings.

BRIEF DESCRIPTION OF THE DRAWINGS

FIG. 3 is a flowchart showing image generating processing according to the first embodiment;

FIG. 7 is a flowchart showing position detecting processing according to the first embodiment;

DESCRIPTION OF THE EMBODIMENTS

Preferred embodiments of the present invention will be described in detail with reference to the attached drawings.

First Embodiment

Figure 1:
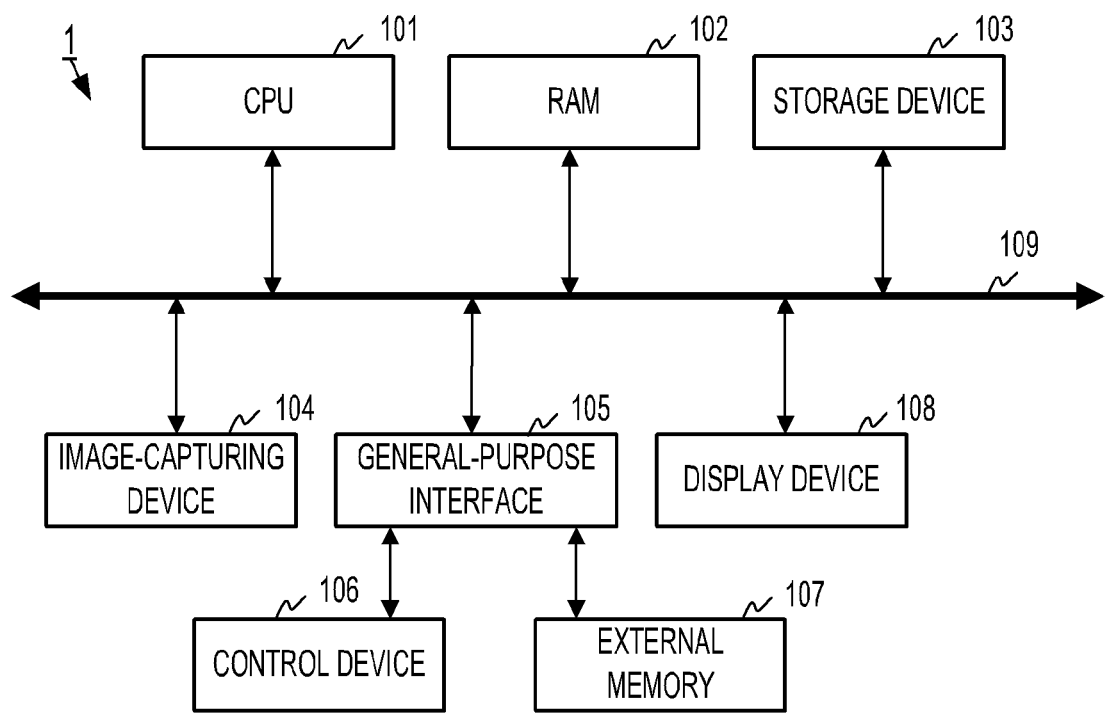
FIG. 1 is a hardware configuration diagram of an image processing device according to a first embodiment.

FIG. 1 illustrates a hardware configuration of an image processing device 1 according to a first embodiment. The image processing device 1 includes a central processing unit (CPU) 101, random-access memory (RAM) 102, a storage device 103, an image-capturing device 104, a general-purpose interface 105, a display device 108, and a main bus 109. The general-purpose interface 105 connects a control device 106 (e.g., a personal computer (PC)) and external memory 107 (e.g., a memory card) to the main bus 109.

Various types of processing that are realized by the CPU 101 operating in accordance with various types of software (computer programs) stored in the storage device 103 will be described below. In a case of each of the various types of processing being carried out, first, the CPU 101 activates a processing application stored in the storage device 103 and loads this processing application to the RAM 102, and also displays a user interface (UI) on the display device 108. Subsequently, the CPU 101 transfers various types of data (data stored in the storage device 103 or the external memory 107), captured images (images acquired by the image-capturing device 104), instructions from the control device 106, or the like, to the RAM 102. The CPU 101 further performs various types of computation relating to images stored in the RAM 102, in accordance with processing contents indicated by an image processing application. Computation results may be displayed on the display device 108 (a display or monitor), or may be stored in the storage device 103 or the external memory 107.

Figure 2:
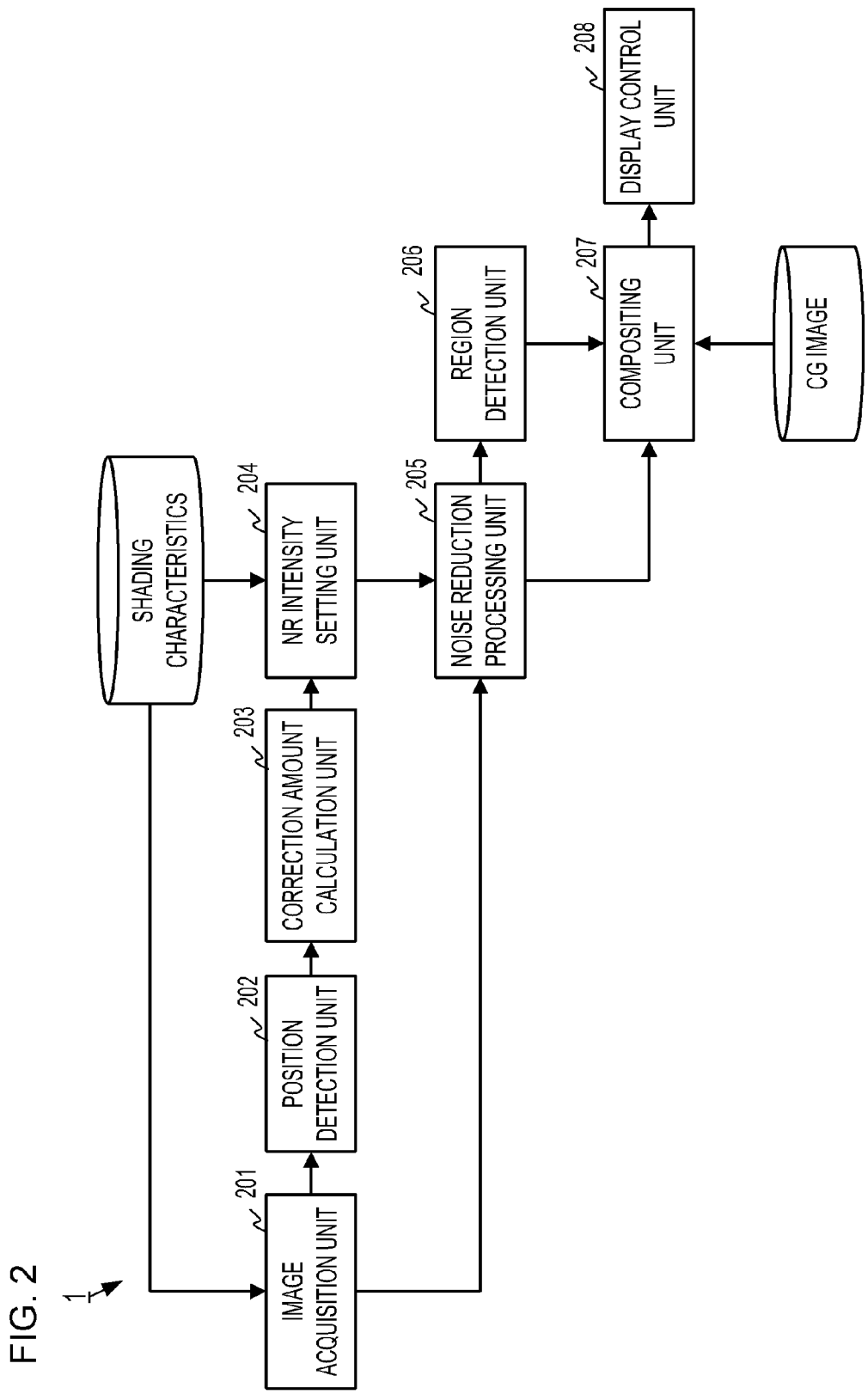
FIG. 2 is a logical configuration diagram of the image processing device according to the first embodiment.

Next, a logical configuration of the image processing device 1 according to the first embodiment will be described with reference to a logical configuration diagram in FIG. 2. The image processing device 1 includes an image acquisition unit 201, a position detection unit 202, a correction amount calculation unit 203, a noise reduction (NR) intensity setting unit 204, a noise reduction processing unit 205, a region detection unit 206, a compositing unit 207, and a display control unit 208. Note that the processing of each of the configurations is realized by the CPU 101 operating as these configurations, for example. Also, information (data) acquired by the configurations, and information (data) processed by the configurations, are stored in the RAM 102.

The image acquisition unit 201 acquires information, which is image-captured real space in which a hand of a user is situated, from the image-capturing device 104, as a captured image. The image acquisition unit 201 also generates an image obtained by subjecting the captured image to shading correction (correction processing, correction of light falloff at edges) for correcting variance in lightness (luminance) of the entire captured image due to a lens of the image-capturing device 104 (hereinafter referred to as "corrected image"). Here, the image acquisition unit 201 corrects pixel values of pixels in the captured image by gain (shading correction amount) in accordance with positions of the pixels. Therefore, the image acquisition unit 201 corrects a pixel value of a first pixel in the captured image by gain in accordance with a position of the first pixel.

Now, due to the effects of the lens when performing image-capturing, the higher the image height of a region in a captured image is (the farther the region is away from the optical center position in the captured image), the darker the region tends to be. Accordingly, on the basis of information of shading characteristics (relation between image height and luminance) held in the storage device 103 in advance, the image acquisition unit 201 sets the shading correction amount to be greater for pixels of which the image height is higher (that are farther away from the optical center position). For example, the image acquisition unit 201 multiplies the pixel values of pixels at the optical center position of the captured image by 1 as the shading correction amount,
thereby correcting these pixel values. Meanwhile, the image acquisition unit 201 multiplies the pixel values of pixels near the four corners of the captured image by 1.5 as the shading correction amount, for example, thereby performing correction such that the pixel values thereof are greater. Note here that is no need to perform shading correction on the entirety of the captured image (all pixels), and may be performed just on pixels at the edges of the captured image. That is to say, multiplication using the shading correction amount may be performed just on pixel values of pixels at the edges of the captured image.

Performing shading correction (correction processing) in this way reduces variance in lightness of the captured image, thereby facilitating detection of the hand by using color information. That is to say, by performing shading correction, with respect to an image which a certain person has been image-captured in and the image is subjected to shading correction, for example, the probability of the color of skin of that person being different between the optical center of the image and at the four corners can be reduced. Conversely, when attempting to detect the hand from a captured image prior to shading correction, the lightness and color differ depending on the position of the hand, and accordingly detecting the hand (position or region of the hand) in a stable manner is difficult.

Note that the captured image may be a moving image made up of a plurality of frames that are still images, or may be a single still image. The reason thereof is that the image processing described hereinafter is capable of being implemented in increments of frames, and is not dependent on the type (moving image or still image) of the image subjected to image processing.

Also, the image acquisition unit 201 may acquire a corrected image from the image-capturing device 104, instead of generating a corrected image from a captured image. That is to say, the image-capturing device 104 may generate corrected images.

The position detection unit 202 detects the position of the hand of the user (position information of the hand) from the corrected image.

On the basis of the position information of the hand, and information of shading characteristics (relation between image height and luminance), the correction amount calculation unit 203 calculates the shading correction amount corresponding to the position of the hand. The shading correction amount corresponding to the position of the hand is the shading correction amount of shading processing executed by the image acquisition unit 201 with regard to the position of the hand in the captured image.

The NR intensity setting unit 204 updates (sets) a reduction parameter (parameter for noise reduction intensity) indicating noise reduction intensity, in accordance with the shading correction amount corresponding to the position of the hand. Note that the initial value of the reduction parameter is set in advance by the manufacturer (maker) of the image processing device 1, for example.

The noise reduction processing unit 205 references the reduction parameter that is updated, and subjects the corrected image to noise reduction processing (processing for reducing noise generated by the shading correction).

The region detection unit 206 detects the region of the hand (hand region) from the corrected image that has been subjected to noise reduction processing (hereinafter referred to as "noise-reduced image"), and acquires an image of the hand region.

The compositing unit 207 generates an image (composited image) in which the image of the hand region and a computer graphics (CG) image (a CG image read in from the storage device 103, the control device 106, or the external memory 107) are composited with the noise-reduced image. Note that instead of the noise-reduced image, the compositing unit 207 may composite the image of the hand region and the CG image with a captured image or a corrected image. The CG image is an image indicating a virtual object (e.g., an object such as a certain piece of furniture, a home electric appliance, or the like).

The display control unit 208 controls the display device 108 so as to display the composited image.

(About Image Generating Processing)

Image generating processing (method for image processing) for generating composited images in the image processing device 1 will be described in detail with reference to the flowchart in FIG. 3. Note that when the captured image is a moving image, the processing shown in FIG. 3 is individually performed for each frame of the corrected image.

In step S301, the position detection unit 202 detects the position of the hand (position information of hand) from the corrected image acquired by the image acquisition unit 201. Note that while the position detection unit 202 detects the position of the hand from the corrected image in the first embodiment, the position of the hand may be detected from the captured image. That is to say, the position detection unit 202 may detect the position of the hand from any image, as long as the image is an image before noise reduction processing is performed.

Figure 4A:
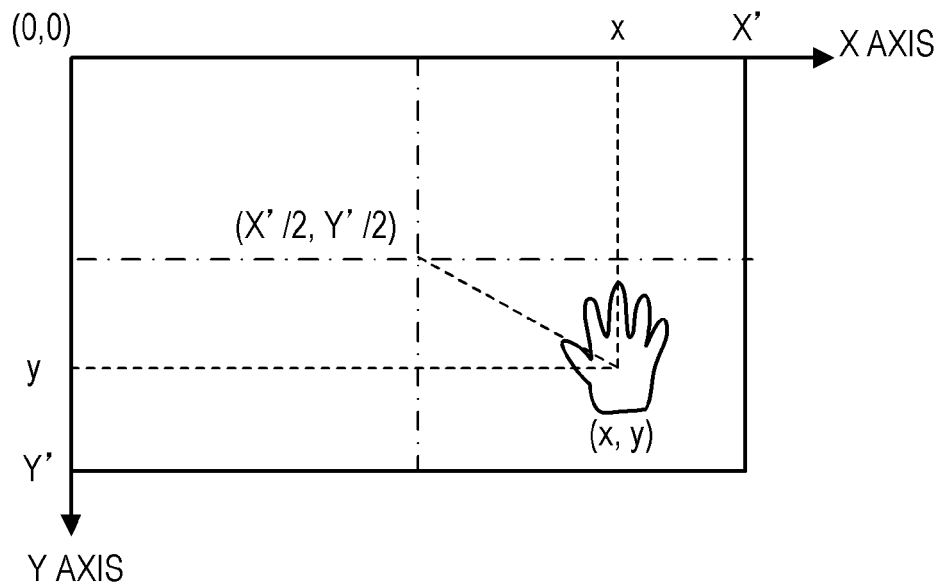
FIG. 4A is a diagram for describing a position of a hand according to the first embodiment.

FIG. 4A is a schematic diagram describing the position of the hand. A case will be assumed in the following in which, with coordinates at the position of the upper-left pixel of the corrected image as coordinates (0, 0), the width direction (lateral direction) of the corrected image is an X-axis direction, and the height direction (vertical direction) is a Y-axis direction. In such a case, coordinates (x, y) at which the hand is placed are obtained as the position of the hand. Note that the position of the hand may be expressed by a coordinate system different from this, and may be coordinates of vertices of a polygon surrounding the hand region, for example. Details of detection processing of the position of the hand (position detection processing) by the position detection unit 202 will be described later (see FIG. 7).

In step S302, the correction amount calculation unit 203 calculates a shading correction amount that corresponds to the position of the hand detected in step S301.

Figure 4B:
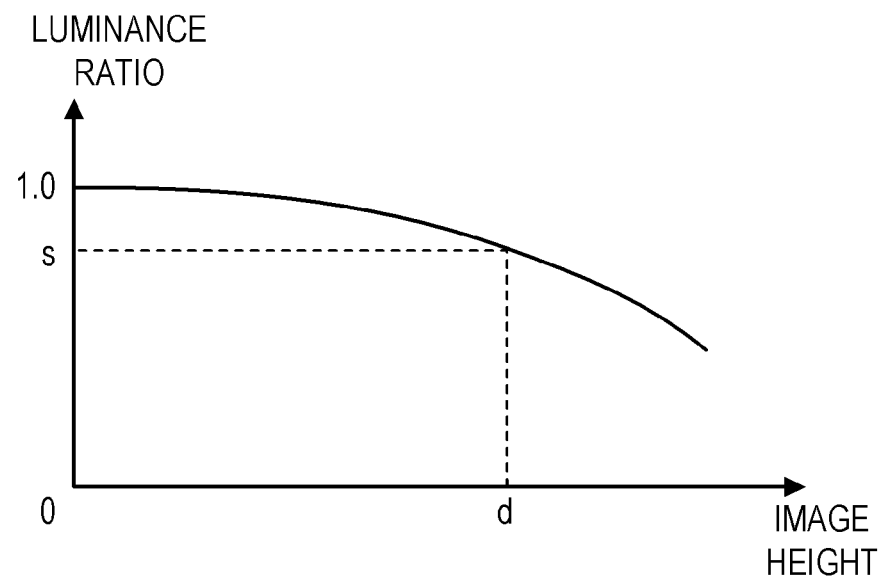
FIG. 4B is a diagram for describing shading characteristics according to the first embodiment.

FIG. 4B shows the luminance of a pixel of which the image height (distance from optical center) is d (luminance ratio s) as shading characteristics (relation between image height and luminance), in a case in which the luminance of a pixel at the optical center is set to 1. That is to say, this indicates that in a case in which a certain object is at the optical center in a captured image, and the luminance of the object is B, the luminance of this object in the captured image will be B×s in a case in which this object is at coordinates of image height d. It can be understood from FIG. 4B that the higher the image height d is, the lower the luminance ratio s will be.

Note that the shading characteristics (relation between image height and luminance) are determined in accordance with characteristics of the lens and sensor of the image-capturing device 104, and accordingly are preferably stored in the storage device 103 or the like in advance, in a lookup table (LUT) format or some other format. In this case, the correction amount calculation unit 203 can calculate the shading correction amount corresponding to the position of the hand, in accordance with the position of the hand, by referencing the LUT. Note that assuming that the coordinates of the optical center are (X'/2, Y'/2), the image height d corresponding to the coordinates (x, y) of the position of the hand can be obtained from the following Expression 1.

$$d = \sqrt{\left(x - \frac{X'}{2}\right)^2 + \left(y - \frac{Y'}{2}\right)^2} \quad (1)$$

The correction amount calculation unit 203 obtains the luminance ratio s corresponding to the image height d of the position of the hand by referencing the LUT, and thereafter obtains the inverse of the luminance ratio s as shading correction amount T by Expression 2.

$$T = \frac{1}{s} \quad (2)$$

Note that while an example in which the shading characteristics are held in an LUT format has been described above, this is not restrictive. For example, an arrangement may be made in which a function (model formula) indicating the correlation between image height and luminance ratio is held in the storage device 103 or the like, and the luminance ratio can be calculated from the image height in accordance with the function. Also, a model or LUT may be held in which the shading correction amount is directly calculable from the image height.

In step S303, the NR intensity setting unit 204 updates the reduction parameter (noise reduction intensity) on the basis of the shading correction amount T corresponding to the position of the hand. Now, the stronger the intensity of shading correction is (i.e., the greater the shading correction amount T is), the more conspicuous the noise is in the corrected image. Accordingly, the reduction parameter is preferably updated to a reduction parameter exhibiting strong noise reduction intensity, the greater the shading correction amount T is. Various types of methods of processing have been proposed for noise reduction processing in which the reduction parameter (noise reduction intensity) is changeable, and accordingly an optional method of processing can be applied from among these.

In the first embodiment, a case of using an c filter, in which the reduction parameter is a threshold value c for noise reduction processing, will be described. Processing using an c filter (noise reduction processing) is processing in accordance with difference between a pixel value P(n) of a pixel that is the object of processing, and a pixel value of a pixel nearby. In processing using an c filter, noise in the corrected image is reduced by substituting the pixel value of the pixel that is the object with an average value of pixel values of a plurality of pixels nearby, of which the difference as to the pixel value of the pixel value P(n) is small. Specifically, processing using an filter can be expressed by the following Expression 3.

$$P'(n) = P(n) + \Sigma_{k=-N}^{N} a_k F(P(n-k) - P(n)) \quad (3)$$

In Expression 3, P(n) is a pixel value of the pixel that is the object of processing in the corrected image. P(n−k) indicates a pixel value (pixel value in the corrected image) of one of the plurality of pixels nearby the pixel that is the object of processing. When k is greater than 0, for example, P(n−k) is a pixel value (pixel value in the corrected image) of a pixel k'th closest to the pixel that is the object out of pixels before the pixel that is the object of processing. When k is smaller than 0, for example, P(n−k) is a pixel value (pixel value in the corrected image) of a pixel −k'th closest to the pixel that is the object out of pixels after the pixel that is the object of processing. P'(n) is the pixel value of the pixel that is the object of processing in the noise-reduced image (output value of pixel value).

Figure 5:
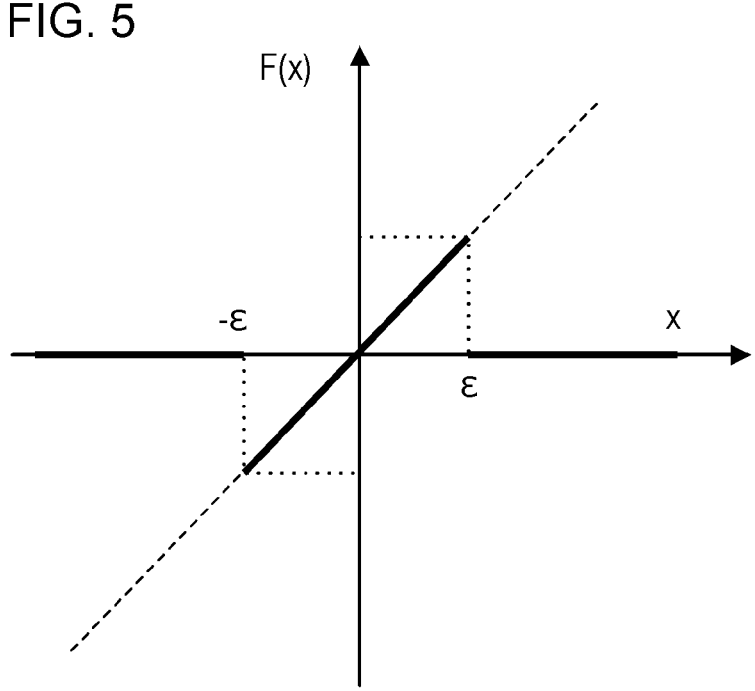
FIG. 5 is a diagram for describing a function relating to calculation of a reduction parameter according to the first embodiment.

A coefficient $a_k$ is a low-pass filter coefficient in which the summation of $a_{-N}$ to $a_{+N}$ is 1. Function F(x) is a nonlinear function that has linearity only within a range of x within ±ε. FIG. 5 is an example of the function F(x). By using the function F(x) in FIG. 5, when the threshold value c that is the reduction parameter becomes greater, the number of pixels nearby that are used for averaging increases, and thus the noise reduction intensity (intensity of reducing noise) becomes stronger. Accordingly, the NR intensity setting unit 204 updates the threshold value c on the basis of Expression 4, using the shading correction amount T calculated in step S302. Note that the threshold value c before updating may be an initial value set in advance by the manufacturer (maker), or may be the threshold value c from the previous frame (previous time), for example.

$$\varepsilon' = \varepsilon T \quad (4)$$

Note that the noise reduction processing and the method of adjusting the reduction parameter (noise reduction intensity) are not limited to the above. For example, bilateral filters, non-local means (NLM) filters, or the like, may be used for the noise reduction processing. Also, with respect to the method of adjusting the reduction parameter, the reduction parameter may be directly updated as in Expression 4. As for the method of adjusting the reduction parameter, the reduction parameter may be newly calculated (adjusted) with reference to a LUT in which is recorded a correlative relation between the shading correction amount and the reduction parameter (noise reduction intensity).

In step S304, the noise reduction processing unit 205 generates a noise-reduced image by reducing noise in the corrected image using the reduction parameter updated in step S303. In the first embodiment, the noise reduction processing unit 205 reduces noise in the corrected image by using an ε filter to the corrected image, using the updated threshold value E.

In step S305, the region detection unit 206 detects the hand region from the corrected image that has been subjected to noise reduction processing (noise-reduced image), and acquires an image of the hand region. Note that the details of processing for detecting the hand region (region detection processing) will be described later (see FIG. 8).

In step S306, the compositing unit 207 composites the noise-reduced image, the image of the hand region, and the CG image (CG image recorded in the storage device 103 or the like), thereby generating a composited image. Now, in a case in which the hand region in the noise-reduced image and the CG image overlap, the compositing unit 207 generates the composited image such that the CG image is superimposed on the noise-reduced image, and the image of the hand region is superimposed thereupon. Thus, the user can constantly view the hand region.

Note that in a case in which the hand region in the noise-reduced image (corrected image) and the CG image do not overlap at the time of generating the composited image, the compositing unit 207 does not perform compositing of the image of the hand region on the noise-reduced image (does not execute hand-masking functions). This is because the hand (hand region) in the noise-reduced image is not presumed to be hidden by the CG image.

Figure 6A:
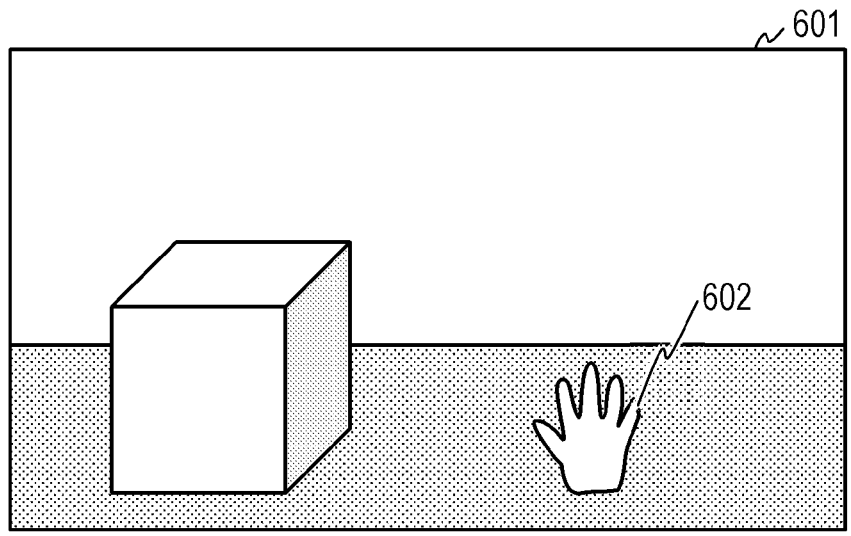
FIGS. 6A to 6C are diagrams for describing an example of a composited image according to the first embodiment.
Figure 6B:
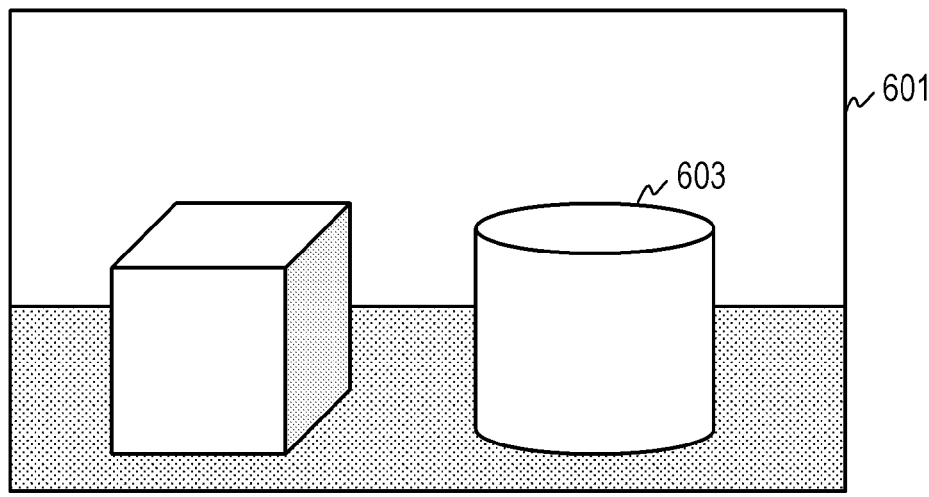
Figure 6C:
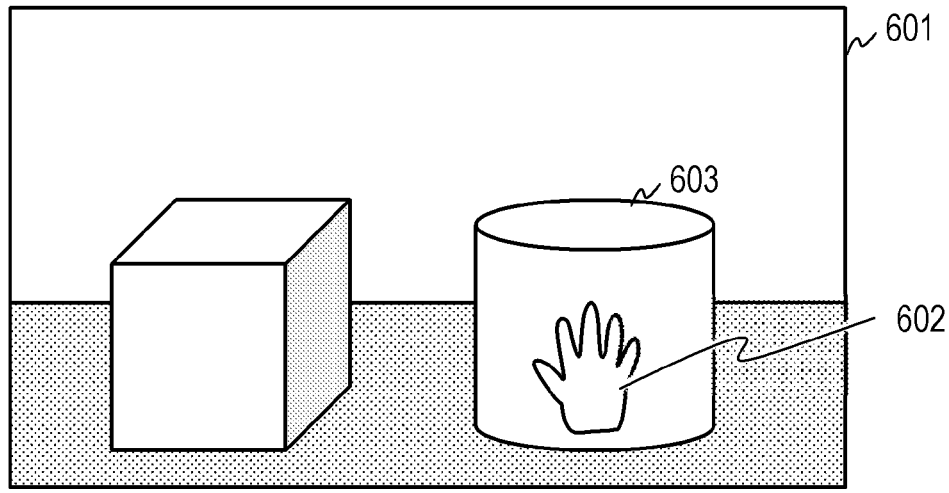

FIGS. 6A to 6C are schematic diagrams for describing an example of a composited image. Here, FIG. 6A illustrates a noise-reduced image 601 including a hand region 602. FIG. 6B illustrates an image in which a CG image 603 is superimposed on the noise-reduced image 601. As illustrated in FIG. 6B, in a case in which the image processing device 1 composites the CG image 603 with the noise-reduced image 601 without detecting the hand region 602, the hand region 602 may become hidden behind the CG image 603.

FIG. 6C is an image in which the CG image 603 and the image of the hand region 602 are superimposed on the noise-reduced image 601 in that order, with reference to the image of the hand region 602 that is detected. In this way, by detecting the hand region 602 and performing compositing taking the relation of the hand region 602 and the CG image 603 into consideration, a composited image can be generated in which the hand appears to be touching the virtual object illustrated in the CG image 603. Note that the composited image is sent from the compositing unit 207 to the display control unit 208, and is displayed on the display device 108.

About Position Detection Processing: S301

The processing of detecting the position of the hand in step S301 (position detection processing) will be described with reference to the flowchart in FIG. 7.

In step S701, the position detection unit 202 obtains information of "color of skin" (color signal value indicating the color of skin), in order to select a skin region from the corrected image. Any known method can be used as a method to acquire information of "color of skin". For example, the position detection unit 202 may acquire color signal values (lightness Y, chroma C, and hue H) for "color of skin" stored in the storage device 103 in advance. The position detection unit 202 may select one pixel of the hand region in the captured image in accordance with user operations, and acquire color signal values of that pixel. In the case of the latter, the coordinates themselves of the pixel that is selected can be output as results of position detection by the position detection unit 202. Description will be made below assuming that the position detection unit 202 has acquired color signal values of "color of skin" that is stored in the storage device 103 in advance.

In step S702, the position detection unit 202 references the color signal values of "color of skin" acquired in step S701, and selects the skin region (a region estimated to be skin, i.e., a region close to the color of skin) from the corrected image. Now, each of the lightness Y, chroma C, and hue H of the color corresponding to the skin region has a breadth (upper/lower limit range) from the color signal values for "color of skin". The position detection unit 202 selects, for example, a region of colors close to the color signal values (lightness Y, chroma C, and hue H) for "color of skin" (e.g., a region of colors included in a range of lightness Y ±5, chroma C ±5, and hue H ±10), out of the corrected image, as a skin region. Note that the upper/lower limit range may be optionally determined by the user, or may be determined in accordance with the overall lightness (average lightness) of the corrected image. Further, the skin region may be determined taking into consideration difference in "color of skin" according to race.

In step S703, the position detection unit 202 executes isolated-point removal processing on the skin region selected in step S702, in order to remove pixels that are included in the skin region despite not being pixels indicating skin (erroneous-determination pixels). A plurality of techniques have been proposed for isolated-point removal processing, and any desired processing may be used. For example, the position detection unit 202 may confirm one pixel and eight nearby pixels, and in a case in which only that one pixel out of these nine pixels is determined to be included in the skin region, that one pixel is determined to be an erroneous-determination pixel. The position detection unit 202 then removes the erroneous-determination pixel from the skin region.

In step S704, the position detection unit 202 calculates a center-of-gravity position for the skin region. Specifically, the position detection unit 202 calculates an average value of the coordinates of all pixels in the skin region, and outputs that average value as the position of the hand. Note that, for example, the position detection unit 202 may detect the position of the hand by combining with various types of image processing, such as further dividing the skin region into a plurality of regions, and detecting the position of the hand from a region with a high density of pixels, out of the plurality of regions, or the like.

About Region Detection Processing: S305

Figure 8:
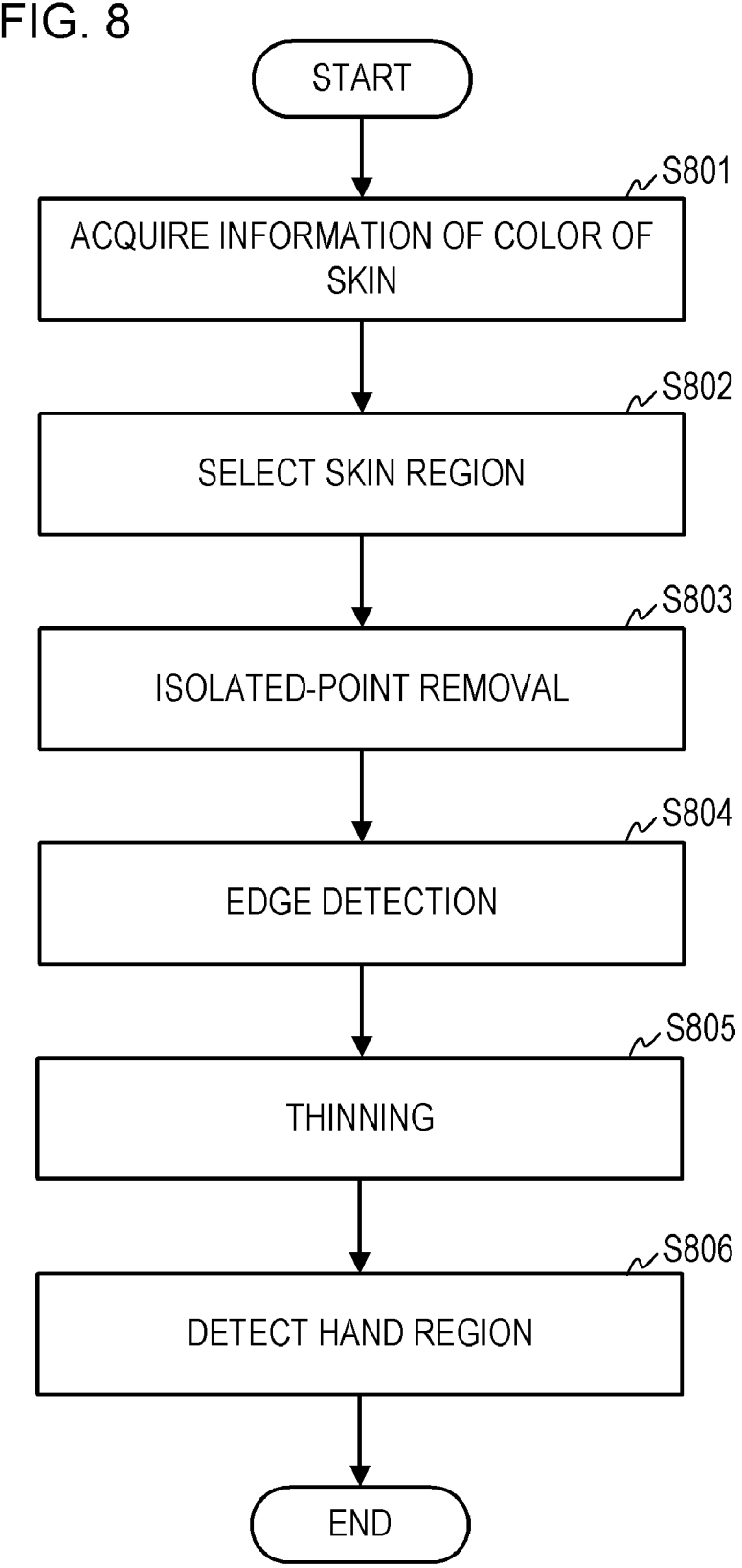
FIG. 8 is a flowchart showing region detecting processing according to the first embodiment.

Processing for detecting the hand region in step S305 (region detection processing) will be described with reference to the flowchart in FIG. 8. Note that in steps S801 to S803, the region detection unit 206 subjects the noise-reduced image to the same processing as in the above steps S701 to S703. Accordingly, description of the processing in steps S801 to S803 will be omitted. Steps S801 to S803 are also performed on the noise-reduced image that is an image after having been subjected to shading correction, and accordingly the skin region can be appropriately determined using color information (color signal values for "color of skin").

In step S804, the region detection unit 206 executes processing of obtaining a boundary (edge) between pixels of the skin region in the noise-reduced image and other pixels (edge detection processing). Various types of edge detection filters (Sobel filter, Laplacian filter, Canny filter, etc.) have been proposed for edge detection in images. Any filter out of such edge detection filters may be used in the present embodiment. Note that these edge detection filters are easily affected by noise. Accordingly, using a noise-reduced image to which appropriate noise reduction processing has been applied in step S304, in accordance with the position of the hand, enables an outline of the hand to be accurately detected as an edge. That is to say, using noise-reduced images enables appropriate hand region detection to be performed.

In step S805, the region detection unit 206 applies thinning processing (processing for thinning a line in a binarized image such that only one pixel worth remains at the center of the line) on the edge detected in step S804. Hilditch, Tamura's algorithm, Zhang Suen, and so forth, have been proposed as algorithms for thinning processing, and any method may be used.

In step S806, the region detection unit 206 detects a region surrounded by the line of the edge that has been subjected to thinning processing in the noise-reduced image, as being the hand region (region of the hand).

Note that the method for detecting the hand region is not limited to this. For example, isolated-point removal or thinning processing may be omitted, the skin region can be selected after performing edge detection for the entirety or a certain partial region of the noise-reduced image. Also, the hand region may be detected so as to include an object held in the hand.

According to the first embodiment, the image processing device 1 reduces noise in a corrected image on the basis of the reduction parameter that is updated in accordance with the position of the hand. Accordingly, an appropriate hand region can be detected from an image that has been subjected to appropriate noise reduction processing in accordance with the position of the hand. The image processing device 1 can then composite the image of the appropriate hand region on a CG image. That is to say, hand-masking functions can be executed in a stable manner.

Second Embodiment

In the first embodiment, the image processing device 1 has been described as detecting a hand region from an image regarding which noise has been reduced by updating the reduction parameter in accordance with the position of the hand (noise-reduced image). Accordingly, there is no need to execute the hand-masking functions in a case in which a CG image does not overlap the hand region in the noise-reduced image, and accordingly the need for updating the reduction parameter (noise reduction intensity) is low. Also, in a case in which the CG image is displayed over the entirety of the noise-reduced image, the captured image is hidden, and accordingly lower image quality due to noise reduction processing can be disregarded.

Accordingly, in a second embodiment, an image processing device 2 that controls the reduction parameter in accordance with display regions of CG images will be described with reference to FIGS. 9 and 10. Note that in the following, portions that are duplicative with the first embodiment will be omitted from description, and only differences therebetween will be described.

Figure 9:
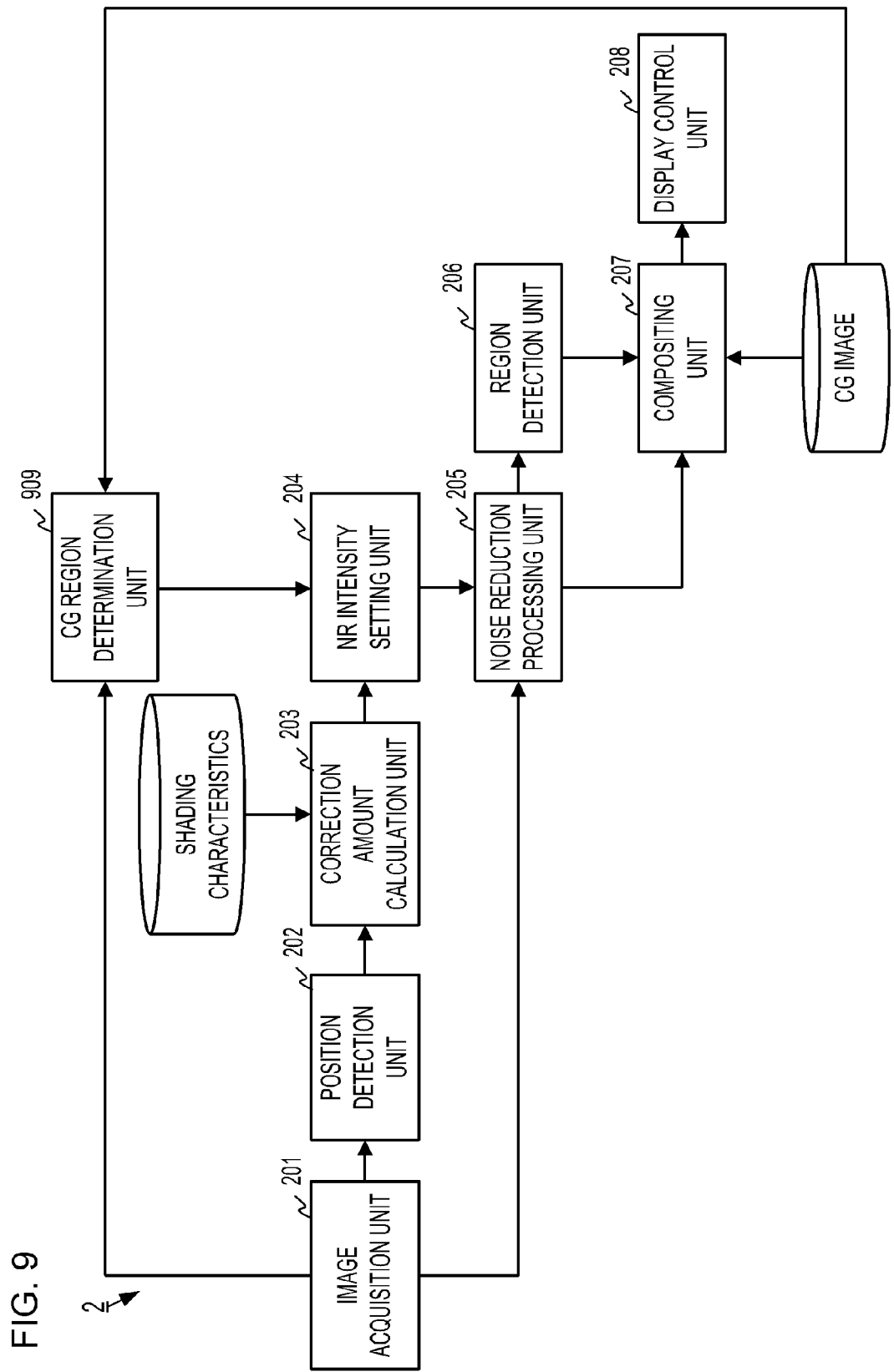
FIG. 9 is a logical configuration diagram of an image processing device according to a second embodiment.
Figure 10:
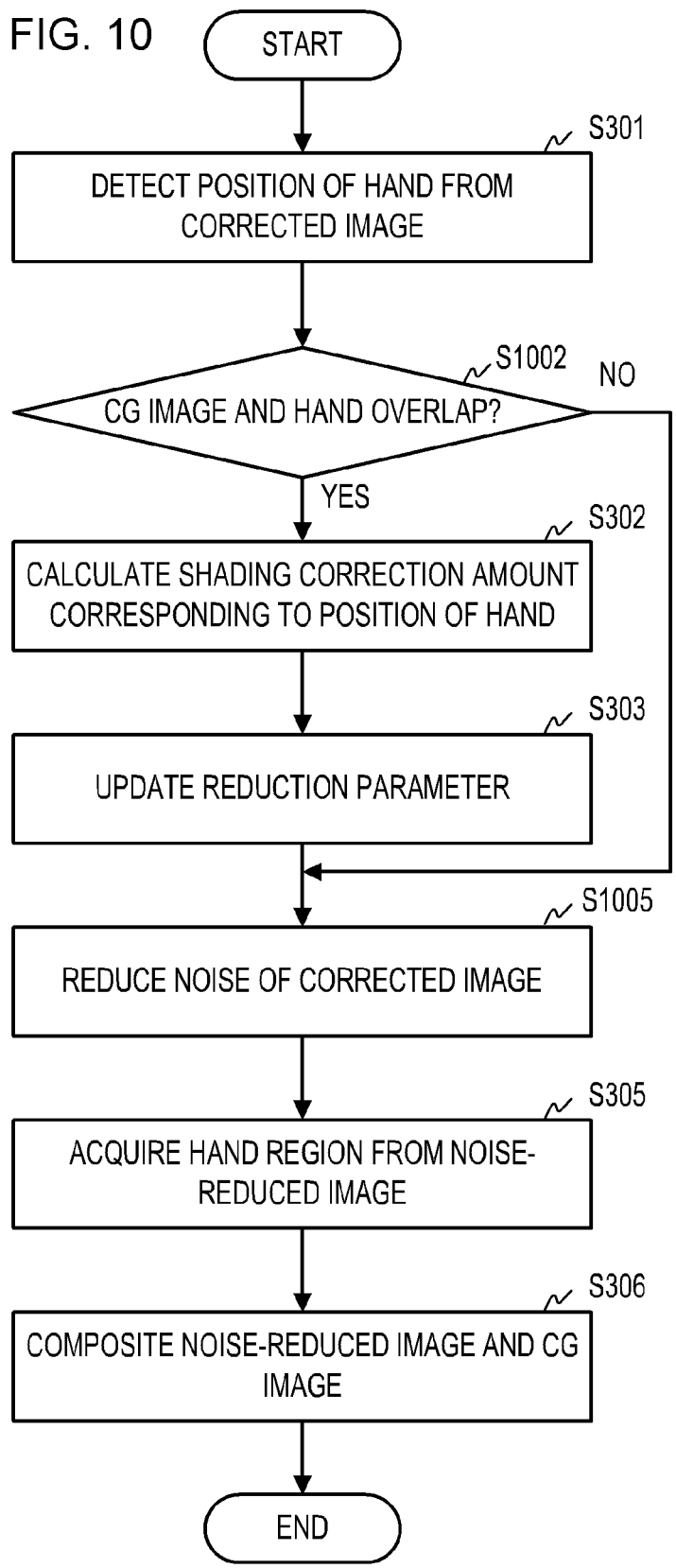
FIG. 10 is a flowchart showing image generating processing according to the second embodiment.

FIG. 9 is a schematic diagram illustrating a logical configuration of the image processing device 2 according to the second embodiment. The image processing device 2 includes the image acquisition unit 201, the position detection unit 202, the correction amount calculation unit 203, the NR intensity setting unit 204, the noise reduction processing unit 205, the region detection unit 206, the compositing unit 207, the display control unit 208, and a CG region determination unit 909. Note that of the above configurations, only differences with respect to the image processing device 1 will be described for configurations that are named the same as the configurations in the image processing device 1.

The CG region determination unit 909 determines whether or not to update the reduction parameter on the basis of the position of the hand detected by the position detection unit 202, and information of the CG image. The NR intensity setting unit 204 controls the reduction parameter in accordance with the determination results thereof.

Details of image generating processing for generating composited images in the image processing device 2 will be described with reference to the flowchart in FIG. Note that steps S301 to S303, S305, and S306 are the same as the steps of the same names in the flowchart in FIG. 3, and accordingly description will be omitted.

On the basis of the position of the hand and the CG image, in step S1002 the CG region determination unit 909 determines whether or not "the CG image will overlap (be superimposed on) the hand region in the noise-reduced image when generating a composited image". In a case in which determination is made that the CG image will overlap the hand region, the flow advances to step S302. In a case in which determination is made that the CG image will not overlap the hand region, the flow advances to step S1005.

Now, an example of determination of whether or not the hand region and the CG image will overlap (superimposition determination) will be described. The image processing device 2 has, in advance, information relating to the coordinates of the position for compositing the CG image and the display size thereof (CG region information), in order to composite the CG image with the noise-reduced image. Accordingly, the CG region determination unit 909 can determine whether or not the hand region and the CG image will overlap by referencing the position of the hand (center-of-gravity coordinates) and the CG region information of the CG image. Note that the CG region information may be attached to the CG image, for example.

For example, with the center-of-gravity coordinates of the hand as (x, y) and the center coordinates of the CG image as (p, q), assumption will be made that the display region of the CG image is a region of a range within a distance r from the center coordinates. Accordingly, the CG region determination unit 909 determines that the CG image will overlap on the hand region in a case in which "p−r≤x≤p+r" and "q−r≤y≤q+r" are both satisfied. Also, the CG region determination unit 909 may determine that the CG image will overlap on the hand region in a case in which the coordinates of any one of all pixels of the hand region are the same coordinates as the coordinates of any one of all pixels of the display region of the CG image, for example.

Be that as it may, the method of superimposition determination of the hand region and the CG image is not limited to this. Also, superimposition determination can be performed regarding CG images made up of data that is even more complicated, by comparing the center-of-gravity position of the CG image converted into coordinate data at the time of displaying in the composited image, and the position of the hand calculated in step S301.

In step S1005, the noise reduction processing unit 205 reduces noise in the corrected image on the basis of the reduction parameter. Note that in a case in which determination is made in step S1002 that the CG image will not overlap the hand region, the processing of step S303 is not executed, and accordingly the same reduction parameter as in processing the previous time (processing of the previous frame of the corrected image) may be used in step S1005. Alternatively, in a case in which determination is made in step S1002 that the CG image will not overlap the hand region, the initial value of the reduction parameter may be used in step S1005. According to these, the processing of steps S302 and S303 is not performed in a case in which determination is made in step S1002 that the CG image will not overlap the hand region, and thus streamlining of the image generating processing can be realized.

In the second embodiment, the image processing device 2 reduces noise of the corrected image without updating the noise reduction parameter in a case in which the hand region and the display region of the CG image will not overlap. Thus, a hand region can be appropriately detected from an image that has been subjected to appropriate noise reduction processing in accordance with the display region of the CG image.

Note that as another form of controlling the reduction parameter (noise reduction intensity) on the basis of the display region of the CG image that has been described in the second embodiment, a case will be considered in which the CG image overlaps the entirety of the noise-reduced image. When the CG image overlaps the entirety of the noise-reduced image, the noise-reduced image is no longer visible, and accordingly lower image quality, in which the sense of resolution deteriorates as compared to that of the corrected image due to noise reduction processing, can be disregarded. Thus, in a case in which the CG image overlaps the entirety of the noise-reduced image, the NR intensity setting unit 204 can set the reduction parameter to the greatest parameter value regardless of the position of the hand, and omit updating of the reduction parameter (processing of steps S302 and S303). Now, the greatest parameter value is a reduction parameter based on the greatest value of shading correction amounts corresponding to each of all pixels in the captured image.

Note that in a case in which the CG image does not overlap the entirety of the noise-reduced image, but the CG image overlaps the noise-reduced image over a range that is greater than a predetermined proportion (e.g., 80%) thereof, the NR intensity setting unit 204 may set the reduction parameter to the greatest parameter value. Also, in such a case, the NR intensity setting unit 204 may, instead of setting the reduction parameter to the greatest parameter value, set the reduction parameter to a certain parameter value (e.g., a predetermined proportion of the greatest parameter value), for example.

Third Embodiment

In the first embodiment, the image processing device 1 has been described as updating the reduction parameter in accordance with the position of the hand. However, in a case in which the captured image is a moving image, and the movement of the hand is fast, there may be cases in which the composited image displayed on the display device 108 appears to be flickering if the reduction parameter is frequently updated.

Accordingly, in a third embodiment, an image processing device 3 that controls the reduction parameter in accordance with the movement speed of the hand will be described with reference to FIGS. 11 and 12. Note that in the following, portions that are duplicative with the first or second embodiments will be omitted from description.

Figure 11:
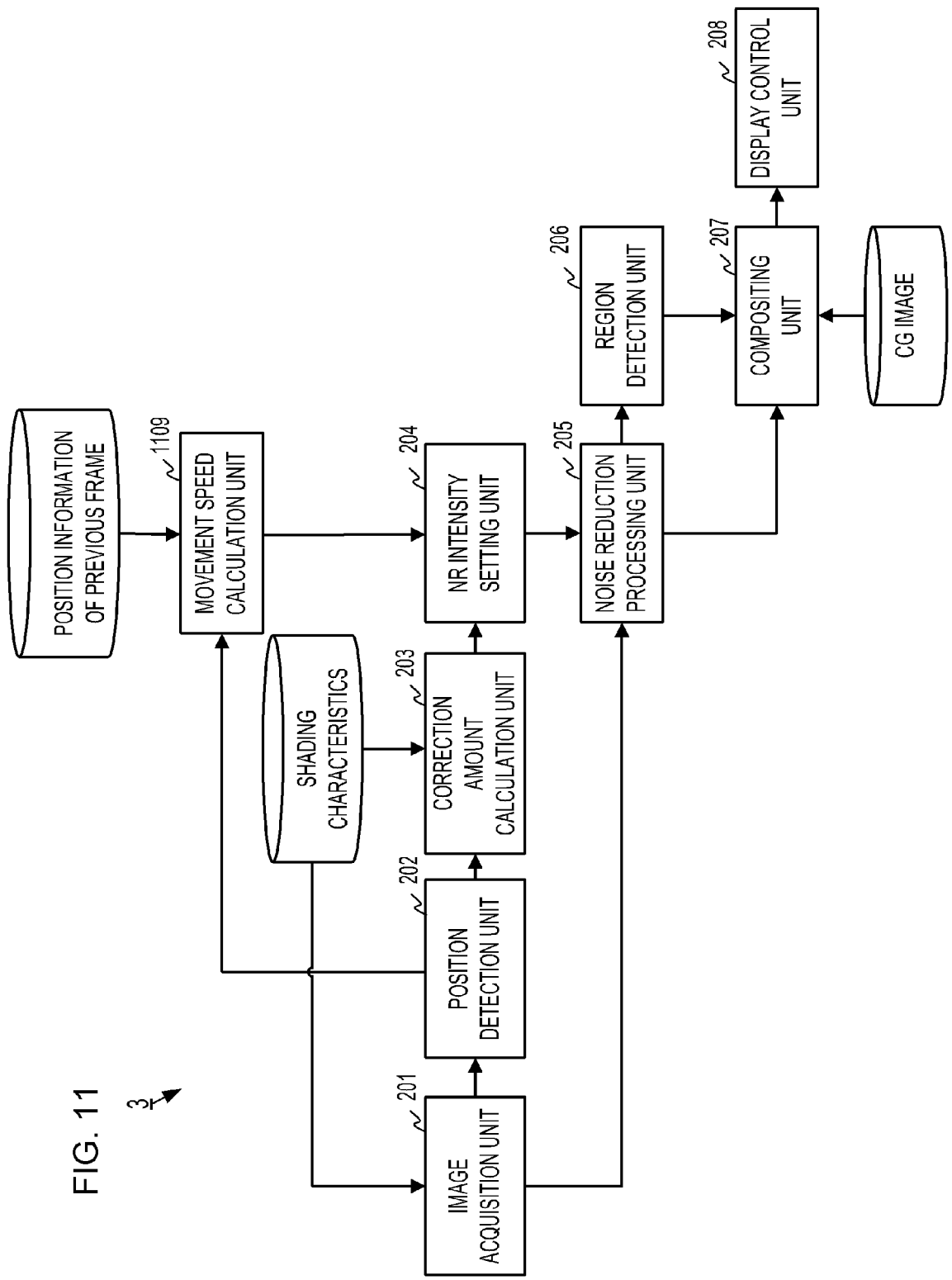
FIG. 11 is a logical configuration diagram of an image processing device according to a third embodiment.
Figure 12:
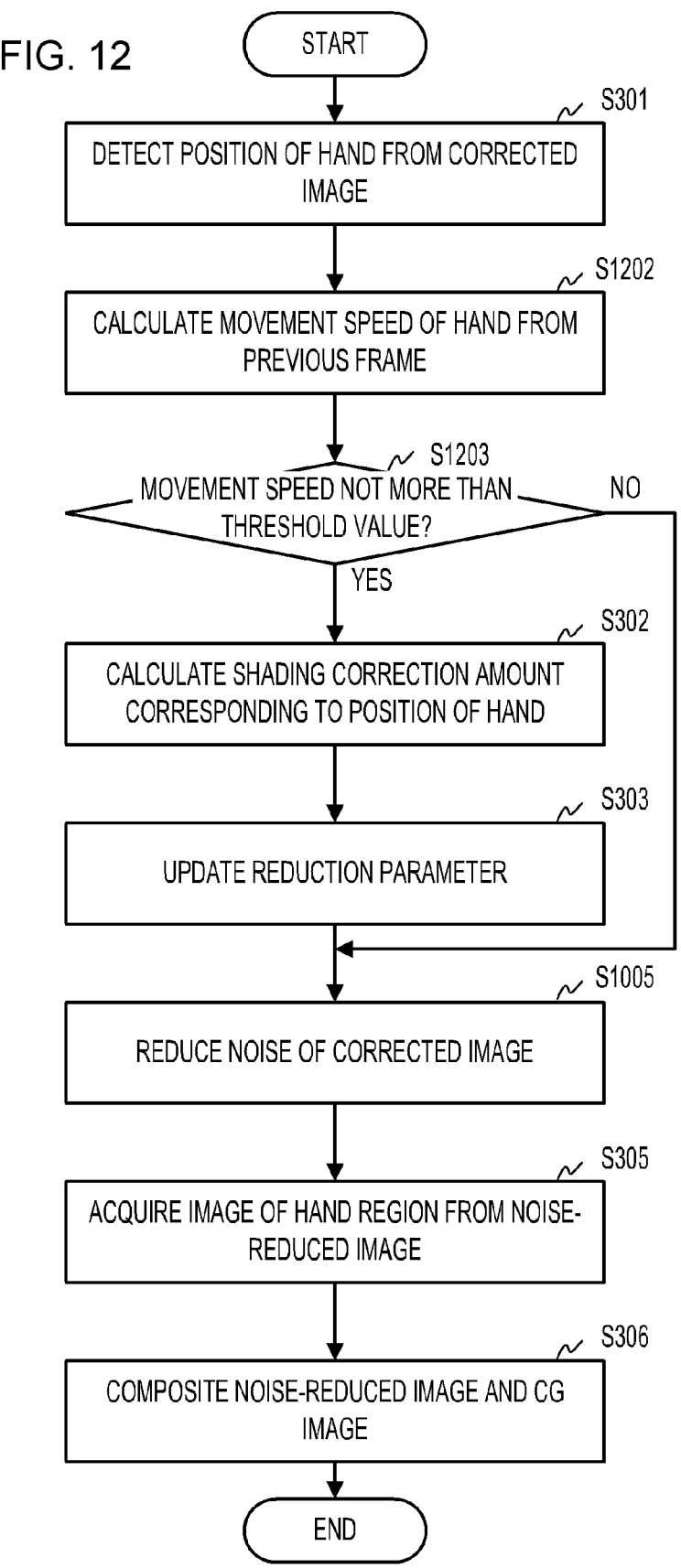
FIG. 12 is a flowchart showing image generating processing according to the third embodiment.

FIG. 11 is a schematic diagram illustrating a logical configuration of the image processing device 3 according to the third embodiment. The image processing device 3 includes the image acquisition unit 201, the position detection unit 202, the correction amount calculation unit 203, the NR intensity setting unit 204, the noise reduction processing unit 205, the region detection unit 206, the compositing unit 207, the display control unit 208, and a movement speed calculation unit 1109. Note that of the above configurations, only differences with respect to the image processing device 1 will be described for configurations that are named the same as the configurations in the image processing device 1.

The movement speed calculation unit 1109 calculates the movement speed of the hand on the basis of the position of the hand that the position detection unit 202 has detected in the current frame of the corrected image, and the position of the hand detected in the previous frame. The movement speed calculation unit 1109 then determines whether or not to update the reduction parameter depending on whether or not the movement speed of the hand is greater than a threshold value. The NR intensity setting unit 204 controls the reduction parameter in accordance with the determination results thereof.

Details of image generating processing for generating composited images in the image processing device 3 will be described with reference to the flowchart in FIG. 12. Description of processing the same as that in the flowchart in FIG. 10 will be omitted.

In step S1202, the movement speed calculation unit 1109 calculates the movement speed of the hand from the previous frame of the corrected image. At this time, the coordinates of the position of the hand in the previous frame are (x', y'), the coordinates of the position of the hand in the current frame detected in step S301 are (x, y), and the framerate of the moving image is 60 fps. In this case, movement speed v of the hand can be calculated by multiplying the distance between the two coordinate sets by 60, as indicated in Expression 5.

$$v = \sqrt{(x'-x)^2 + (y'-y)^2} * 60 \quad (5)$$

In step S1203, the movement speed calculation unit 1109 determines whether or not the movement speed calculated in step S1202 is not more than a threshold value. In a case in which determination is made that the movement speed is not more than the threshold value, the flow advances to step S302. In a case in which determination is made that the movement speed is greater than the threshold value, the flow advances to step S1005. Note that, in a case in which determination is made in step S1203 that the movement speed is greater than the threshold value, in step S1005 the noise reduction processing unit 205 reduces noise of the corrected image by using the reduction parameter from the previous frame (previous time) without change.

In the third embodiment, the image processing device 3 reduces noise of the corrected image without updating the reduction parameter from the previous frame (previous time) in a case in which the movement speed (movement amount) of the hand is fast among frames. Thus, the hand region can be appropriately detected while suppressing flickering of the composited image due to updating of the reduction parameter.

Note that the flow may advance to step S302 even in a case in which the movement speed is greater than the threshold value in step S1203. In this case, in step S303 the NR intensity setting unit 204 calculates an average value of the reduction parameter of the previous frame and the reduction parameter calculated by the method according to the first embodiment, for example, as the reduction parameter of the current frame. This method also can suppress the reduction parameter from greatly changing from that of the previous frame, and accordingly flickering of the composited image can be suppressed.

Also, in the third embodiment, the movement speed calculation unit 1109 has been described as calculating the movement speed on the basis of the position of the hand in the current frame of the corrected image and the position of the hand in the previous frame. However, the movement speed calculation unit 1109 may calculate the movement speed on the basis of the position of the hand in a frame that is two frames back from the current frame, and the position of the hand in the current frame, for example. That is to say, the movement speed calculation unit 1109 may calculate the movement speed on the basis of change in the position of the hand in a plurality of frames of the corrected image, not limited to the two frames that are the previous frame and the current frame.

According to the present invention, in a case of overlaying and compositing an image of a region of a hand on a CG image, an image of a more appropriate region of the hand can be composited.

Also, in the above, "in a case in which A is at least B, the flow advances to step S1, and in a case in which A is smaller than (lower than) B, the flow advances to step S2" may be reread as "in a case in which A is greater (higher) than B, the flow advances to step S1, and in a case in which A is not more than B, the flow advances to step S2". Conversely, "in a case in which A is greater (higher) than B, the flow advances to step S1, and in a case in which A is not more than B, the flow advances to step S2" may be reread as "in a case in which A is at least B, the flow advances to step S1, and in a case in which A is smaller than (lower than) B, the flow advances to step S2". Accordingly, the expression "at least A" may be substituted with "A or greater (higher, longer, more) than A", and may be reread as "greater (higher, longer, more) than A" and substituted, insofar as there is no contradiction. Conversely, the expression "not more than A" may be substituted with "A or smaller (lower, shorter, less) than A", and may be substituted with "smaller (lower, shorter, less) than A" and reread. Also, "greater (higher, longer, more) than A" may be reread as "at least A", and "smaller (lower, shorter, less) than A" may be reread as "not more than A".

Although the present invention has been described in detail by way of preferred embodiments thereof, the present invention is not limited to these particular embodiments, and various forms made without departing from the spirit and scope of the invention are also encompassed by the present invention. Part of the above-described embodiments may be combined as appropriate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-109291, filed on Jul. 6, 2022, which is hereby incorporated by reference herein in its entirety.

What is claimed is:

1. An image processing device comprising:
at least one memory and at least one processor which function as a plurality of units comprising:
(1) an acquisition unit configured to acquire a second image, obtained by subjecting a pixel of a first image, in which a hand of a user is captured, to correction processing with a correction amount in accordance with a position of the pixel in the first image;

(2) a setting unit configured to (a) acquire a correction amount, corresponding to a position of the hand, among a plurality of correction amounts of the correction processing respectively corresponding to a plurality of pixels of the first image, and (b) set a reduction intensity of noise of the second image in accordance with the acquired correction amount;

(3) a processing unit configured to generate a third image in which the noise of the second image is reduced by the reduction intensity set by the setting unit;

(4) a detection unit configured to detect a region of the hand from the third image; and (5) a compositing unit configured to generate a composited image by compositing a computer graphics (CG) image and an image of the region of the hand with the third image, with reference to information of the region of the hand detected by the detecting unit.

2. The image processing device according to claim 1, wherein the detecting unit detects an edge from at least a partial region in the third image, and detects the region of the hand on a basis of the edge.

3. The image processing device according to claim 1, wherein the correction amount is greater as the position of the hand in the first image is farther from a position of an optical center, and
wherein the setting unit sets the reduction intensity to be stronger as the correction amount is greater.

4. The image processing device according to claim 1, wherein in accordance with whether or not the region of the hand in the third image and the CG image overlap in a case of generating the composited image, the setting unit controls the reduction intensity.

5. The image processing device according to claim 4, wherein in a case where the region of the hand in the third image and the CG image do not overlap in a case of generating the composited image, the setting unit does not update the reduction intensity from a previous time.

6. The image processing device according to claim 4, wherein in a case where the CG image overlaps an entirety of the third image in a case of generating the composited image, the setting unit sets the reduction intensity of in accordance with a greatest value of the correction amount corresponding to each of all pixels of the first image.

7. The image processing device according to claim 1, wherein the first image is a moving image,
wherein the at least one memory and the at least one processor further function as a movement speed calculation unit configured to calculate a movement speed of the hand, in accordance with a plurality of frames in the second image, and
wherein the setting unit controls the reduction intensity on a basis of the movement speed.

8. The image processing device according to claim 7, wherein the setting unit does not update the reduction intensity from a previous time in a case where the movement speed is greater than a threshold value.

9. The image processing device according to claim 1, wherein the detection unit detects the region of the hand from the third image in accordance with information of color.

10. The image processing device according to claim 1, wherein the detection unit detects a region including an object held in the hand as the region of the hand.

11. The image processing device according to claim 1, wherein the at least one memory and the at least one processor further function as a position detection unit configured to detect the position of the hand from the first image or the second image.

12. The image processing device according to claim 1, wherein the setting unit sets the reduction intensity for an entirety of the second image in accordance with the acquired correction amount.

13. A method for image processing, the method comprising:
acquiring a second image, obtained by subjecting a pixel of a first image, in which a hand of a user is captured, to correction processing with a correction amount in accordance with a position of the pixel in the first image;
acquiring a correction amount, corresponding to a position of the hand, among a plurality of correction amounts of the correction processing respectively corresponding to a plurality of pixels of the first image;
setting a reduction intensity of noise of the second image in accordance with the acquired correction amount;
generating a third image in which the noise of the second image is reduced by the reduction intensity set in the setting;
detecting a region of the hand from the third image; and
generating a composited image by compositing a computer graphics (CG) image and an image of the region of the hand with the third image, with reference to information of the region of the hand detected in the detecting.

14. A non-transitory computer-readable medium that stores a program, wherein the program causes a computer to execute a method for image processing, the method comprising:
acquiring a second image, obtained by subjecting a pixel of a first image, in which a hand of a user is captured, to correction processing with a correction amount in accordance with a position of the pixel in the first image;
acquiring a correction amount, corresponding to a position of the hand, among a plurality of correction amounts of the correction processing respectively corresponding to a plurality of pixels of the first image;
setting a reduction intensity of noise of the second image in accordance with the acquired correction amount;
generating a third image in which the noise of the second image is reduced by the reduction intensity set in the setting;
detecting a region of the hand from the third image; and
generating a composited image by compositing a computer graphics (CG) image and an image of the region of the hand with the third image, with reference to information of the region of the hand detected in the detecting.

* * * * *